United States Patent [19]

Tsunefuji

[11] 4,167,313
[45] Sep. 11, 1979

[54] FOCAL PLANE SHUTTER CAMERA HAVING AN ELECTROMAGNETIC DIAPHRAGM MECHANISM

[75] Inventor: Katsuhiko Tsunefuji, Hachioji, Japan

[73] Assignee: Olympus Optical Co., Ltd., Tokyo, Japan

[21] Appl. No.: 857,249

[22] Filed: Dec. 5, 1977

[30] Foreign Application Priority Data

Dec. 29, 1976 [JP] Japan .................. 51-160049

[51] Int. Cl.² .............................. G03B 7/08
[52] U.S. Cl. ........................ 354/31; 354/38
[58] Field of Search ................... 354/29–31, 354/36, 38, 40, 43, 44, 46, 50, 51, 60 R, 60 L, 228, 234, 271, 273; 352/141

[56] References Cited

U.S. PATENT DOCUMENTS

| | | | |
|---|---|---|---|
| 3,416,421 | 12/1968 | Biederman et al. | 354/43 X |
| 3,593,629 | 7/1971 | Rentschler | 354/60 X |
| 3,626,825 | 12/1971 | Years | 354/60 R X |
| 3,721,167 | 3/1973 | Ogiso | 354/31 |
| 3,829,867 | 8/1974 | Ono | 354/29 X |
| 3,950,767 | 4/1976 | Matsui | 354/60 L X |
| 3,972,055 | 7/1976 | Matsuda et al. | 354/29 X |
| 3,973,266 | 8/1976 | Kakunodate et al. | 354/31 |
| 4,015,198 | 3/1977 | Iwashita et al. | 354/43 X |
| 4,062,023 | 12/1977 | Kobori et al. | 354/38 |
| 4,079,386 | 3/1978 | Murakami et al. | 354/38 X |
| 4,100,558 | 7/1978 | Kajke et al. | 354/271 |
| 4,126,874 | 11/1978 | Suzuki et al. | 354/60 R |

*Primary Examiner*—L. T. Hix
*Assistant Examiner*—Willliam B. Perkey
*Attorney, Agent, or Firm*—Lerner, David, Littenberg & Samuel

[57] ABSTRACT

A focal plane shutter camera of a type which employs photometry measuring light reflected by the shutter blind and/or the film has an electromagnetic diaphragm mechanism and is capable of automatic photographing with a preset exposure. By providing at least two light receiving elements which perform the photometry of reflected light to automatically determine an exposure value, the camera may select among four photographing modes including a manual photographing, an automatic photographing with a preset diaphragm aperture, an automatic photographing with a preset exposure period and an automatic programmed photographing operation.

8 Claims, 9 Drawing Figures

|    | SW4 | SW5 | SW6 | SW7 | SW8 | SW9 | SW10 | SW11 |
|----|-----|-----|-----|-----|-----|-----|------|------|
| Off |   |   |   |   |   | Off | Off | Off |
| M  |   |   | a | a | b | Off | Off | On |
| AA |   | b | a | a | a | Off | Off | On |
| SA | b | a |   | b | b | On | On | On |
| PA | a | b | b | a | a | On | On | On |

FIG. 9

FOCAL PLANE SHUTTER CAMERA HAVING AN ELECTROMAGNETIC DIAPHRAGM MECHANISM

BACKGROUND OF THE INVENTION

The invention relates to a focal plane shutter camera having an electromagnetic diaphragm mechanism.

A camera employing an electrically operated focal plane shutter, being controlled by photometry measuring light reflected by the shutter blind and/or the film, such as a single lens reflex camera of focal plane shutter type is capable of an automatic photographing operation with a preset diaphragm aperture in which the diaphragm aperture is previously selected and the exposure period is automatically determined, and a manual operation in which both the diaphragm aperture and the exposure period are manually determined. However, such camera is incapable of an automatic photographing with a preset exposure period in which the exposure period is preset and the diaphragm aperture is automatically determined or an automatic, programmed photographing operation in which both the diaphragm aperture and the exposure period are automatically determined.

However, it will be appreciated that it is convenient to provide a single camera which permits a selection among these various photographing modes to enable a greater flexibility in the photographing operation. However, the resulting arrangement will require at least two light receiving elements for the purpose of photometry, with a consequent complicated circuit arrangement to cause an increase in cost, which prevented its practical implementation.

SUMMARY OF THE INVENTION

It is a first object of the invention to provide a focal plane shutter camera of the type employing photometry measuring light reflected by the shutter blind and/or the film, having an electromagnetic diaphragm mechanism, and being capable of automatic photographing with a preset exposure period.

It is a second object of the invention to provide a focal plane shutter camera having an electromagnetic diaphragm mechanism in which camera a selection among four photographing modes including a manual photographing, an automatic photographing with a preset diaphragm aperture, an automatic photographing with a preset exposure period and an automatic, programmed photographing operation is made possible through a mode switching arrangement, by providing at least two light receiving elements which perform the photometry of reflected light from a shutter blind of the focal plane shutter and/or the film surface to determine an exposure value automatically.

The camera of the invention is constructed such that the shutter cannot be operated during a manual photographing and an automatic photographing with a preset diaphragm aperture unless the diaphragm aperture is previously limited to a given value. It is also constructed such that during an automatic photographing with a preset exposure period and during an automatic, programmed photographing, the operation of the shutter is enabled only when the diaphragm aperture reaches a proper exposure value and the shutter operation is blocked when a proper exposure value is not reached, with a corresponding indication being given within the viewfinder.

With the camera of the invention, in the event the voltage of a power supply for the electrical circuit has reduced below a given value or when a diaphragm aperture is selected with which a proper exposure can not be reached, a movable reflecting mirror is held up to leave a taking light path open and the shutter operation is blocked when the shutter button is depressed, thus avoiding any waste of the film. Under such condition, another button may be operated to return the movable reflecting mirror to its initial position, and subsequently the source battery may be replaced or the exposure parameters may be reselected to enable a shutter release operation.

When the camera of the invention is used for an automatic, programmed photographing operation, a choice among more than one programmed conditions is made possible. This is achieved by the provision of a programmed condition switching device which modifies the program in an automatic, programmed photographing operation and which is independent from a photographing mode selection switching device which selects one of the described photographing modes. The programmed condition switching device is enabled only when an automatic, programmed photographing operation is selected. An advantage of such an arrangement will be appreciated when switching through the programmed photographing, an automatic photographing with preset exposure period and then back to a programmed photographing in a sequential manner since then the programmed condition established during the initial programmed photographing operation is maintained in the subsequent programmed photographing operation and since an operation of the programmed condition switching device at a time other than the automatic, programmed photographing operation is selected does not have any influence upon other photographing modes.

DESCRIPTION OF PREFERRED EMBODIMENT

Figure 1:
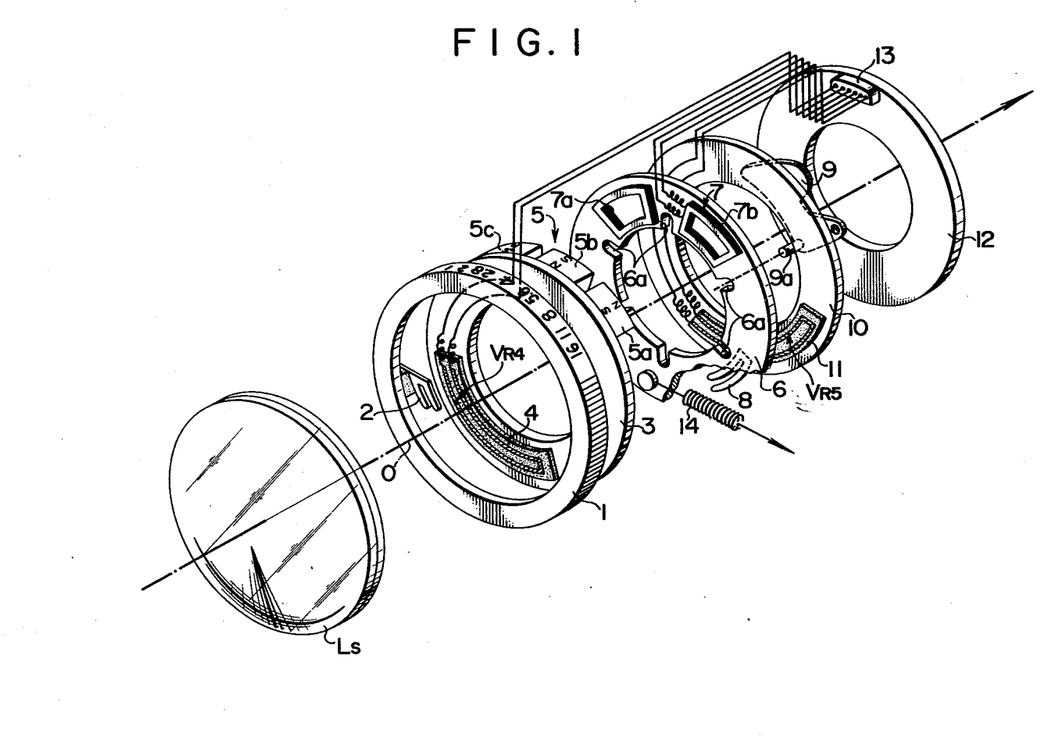
FIG. 1 is an exploded perspective view of one form of electromagnetic diaphragm mechanism used in single lens reflex camera in which the invention is incorporated.

Referring to FIG. 1, there is shown an electromagnetic diaphragm mechanism which is detachably mounted on a camera body and which is located inside a lens barrel in which a taking lens Ls is assembled. The mechanism includes a diaphragm ring 1 which is rotatably retained within the lens barrel, not shown, and which fixedly carries a sliding electrical contact 2 on its inner end face. The contact 2 is arranged for sliding contact with a resistor provided on a resistor substrate 4, thus constituting together a variable resistor VR4. The substrate 4 is secured to an end face of a yoke 3 which opposes the contact 2, the yoke 3 being formed of a magnetic material and secured to the lens barrel. On the other end face, the yoke 3 fixedly carries an annular array of permanent magnets 5a, 5b, 5c . . . around its periphery which have their opposite polarities arranged in the alternate fashion as shown. Rearwardly of the yoke 3 or to the right, as viewed in FIG. 1, a diaphragm blade drive ring 6 is rotatably carried by the lens barrel and carries a plurality of coils 7a, 7b . . . on its surface which faces the permanent magnets 5a, 5b, 5c . . . , while the rear surface of the ring 6 fixedly carries a sliding electrical contact 8. It is to be noted that all of the permanent magnets and coils are not shown but that the magnets 5a, 5b, 5c and coils 7a, 7b are shown as merely representative ones. The drive ring 6 is formed with a plurality of radially extending notched grooves 6a around its inner periphery surrounding a central opening thereof, which grooves are engaged by a drive pin 9a fixedly mounted on diaphragm blades 9 (only one being shown), respectively. The diaphragm blade 9 has its one end pivotally mounted on a stationary member of the lens barrel, and is adapted to rock about the pivot as the drive ring 6 rotates to define a diaphragm aperture. A yoke 10 comprising a magnetic material is secured to the lens barrel rearwardly of the drive ring 6, and carries a resistor substrate 11 at a position opposing the electrical contact 8. The sliding contact 8 and the resistor on the substrate 11 form together a variable resistor VR5.

A lens mount 12 is disposed at the rear end of the lens barrel, and carries a connector 13 on its front end face. The lead wires extending from the variable resistors VR4, VR5 and coils 7a, 7b . . . are connected with the connector 13 so that these components are connected with an electrical circuit contained in the camera body by the mating engagement of the connector 13 with a corresponding connector 16 (see FIG. 2) provided on the part of the camera body when the lens barrel is mounted on the camera body. It will be noted that the diaphragm blade drive ring 6 is urged by a spring 14 to rotate counter-clockwise about the optical axis O, thus normally maintaining the diaphragm blades in their fully open position.

Figure 2:
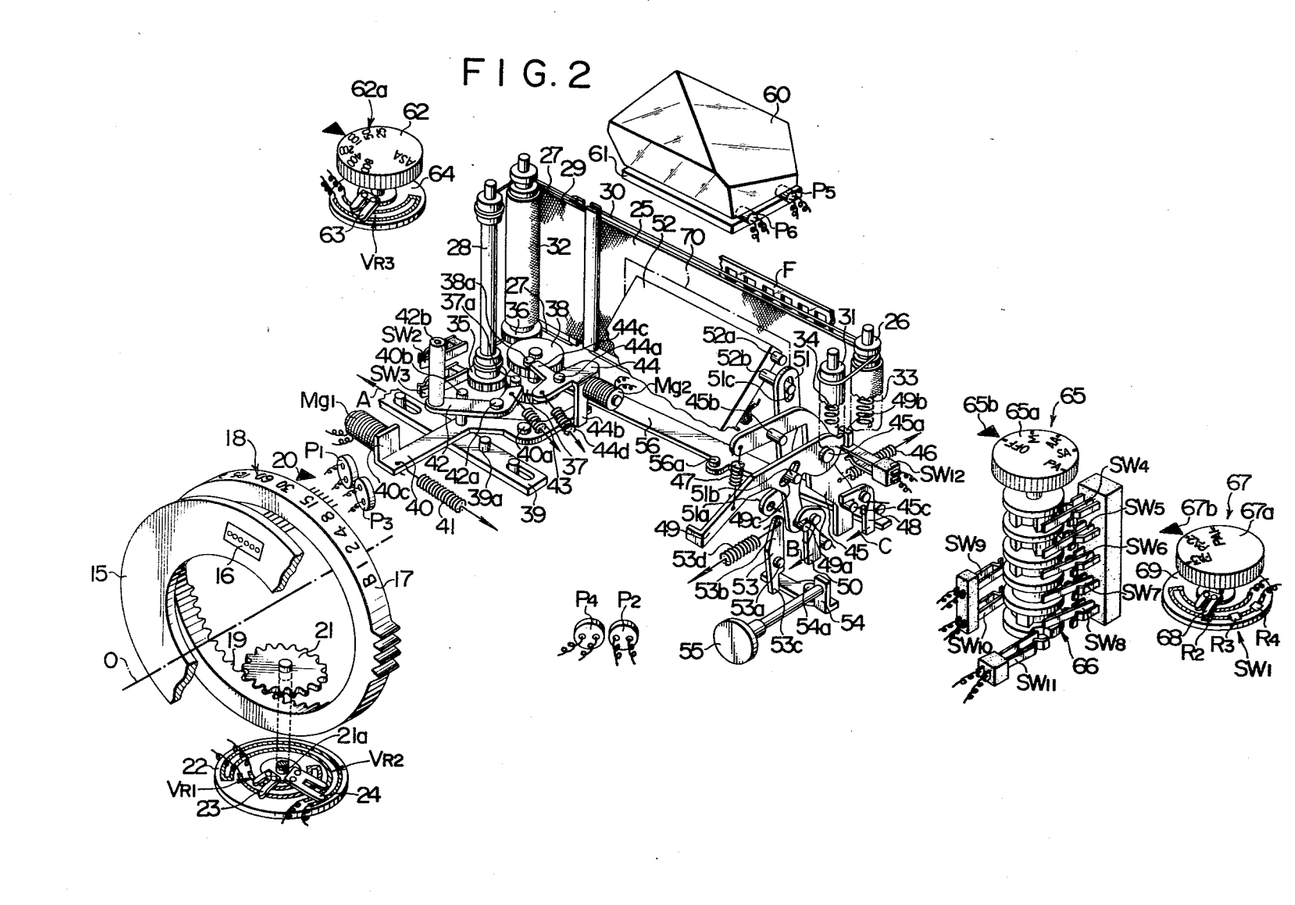
FIG. 2 is an exploded perspective view of the interior construction of the single lens reflex camera.

FIG. 2 shows various mechanisms including the first and second shutter blind drive mechanisms which are provided on the part of the camera body, not shown. In FIG. 2, parts are shown in the positions which they assume at the termination of a shutter charging operation. The connector 16 is fixedly mounted on a mount 15 which is associated with the camera body for mating engagement with the connector 13 provided on the part of the lens barrel. A shutter speed presetting ring 17 is rotatably supported between the mount 15 and the camera body, and is formed with a shutter speed scale 18 around its peripheral surface. The scale 18 is effective to indicate a chosen exposure period by rotating the ring 17 until a desired figure on the scale is aligned with an index 20 marked on the camera body. Around part of the inner surface, the ring 17 is partially toothed to provide a gear 19, which meshes with a gear 21. The gear 21 is fixedly mounted on a shaft 21a which is rotatably mounted on a stationary member such as the base plate of the camera body, with a pair of sliding electrical contacts 23, 24 being secured to the lower portion of the shaft 21a by means of mounting plates, and disposed for sliding contact with resistors formed on a resistor substrate 22 which is fixedly mounted below the shaft, thus forming variable resistors VR1, VR2.

The focal plane shutter includes a first blind 25, which has its one end secured to a take-up shaft 26 while the other end is secured to a winding shaft 28 through conducting cords 27. It is to be noted that the surface of the first blind 25 is treated in a manner to present the same optical reflectivity as that of the exposed surface of a film F. The shutter also includes a second blind 29, one end of which is secured to a take-up shaft 31 through conducting cords 30 while the other end is fixedly mounted on a winding shaft 32. As is well recognized, coiled springs 33, 34 are internally housed within the take-up shafts 26, 31 for driving the shutter, and are charged in connection with a film winding operation. A small diameter gear 35 is fixedly mounted on the lower end of the winding shaft 28 and a small diameter gear 36 is fixedly mounted on the lower end of the winding shaft 32, these gears 35, 36 meshing with larger diameter gears 37, 38, respectively, which are disposed in vertically coaxial relationship one above another and are driven to their positions shown during a film winding operation. A detent pin 37a is provided on the gear 37 for constraining the first blind, and a detent pin 38a is provided on the gear 38 for constraining the second blind.

A film winding lever 39 is slidably supported on the camera body, and when a film winding operation is performed, it moves in a direction indicated by an arrow A, and then returns to the position shown at the termination of the winding operation. Adjacent to the gears 37, 38, a lever 40 which unlocks the first blind 25 is pivotally mounted on a pin 40a, and has one arm which extends outwardly, traversing over the central portion of the winding lever 39, with an armature piece 40c formed at its end which is disposed in opposing relationship with an electromagnet Mg1, which serves for constraining the first blind from running. The electromagnet Mg1 includes a permanent magnet as a core on which a demagnetizing coil is disposed. The unlocking lever 40 is biased by a coiled tension spring 41 engaging one arm thereof to rock counter-clockwise about the pin 40a. However, when the winding lever 39 moves in the direction of the arrow A, one arm of the lever 40 is urged by the pin 39a on the lever 39, whereby the lever 40 rotates clockwise about the pin 40a against the bias of spring 41. Thus the armature piece 40c is attracted by the magnet of the electromagnet Mg1, thereby preventing a rotation which may result from the action of the spring 41 at the termination of the film winding operation. When the coil is energized by a first blind run signal from an electrical circuit to be described later, the excitation of the coil is effective to demagnetize the magnet, thus terminating the attraction of the armature piece 40c.

A first blind locking lever 42 is disposed between the unlocking lever 40 and the gear 37, and is pivotally mounted on a pin 42a. The lever 42 includes one arm which extends over the arm of the unlocking lever 40, and another arm which extends toward the detent pin 37a on the gear 37 and which is engaged by a coiled tension spring 43. Thus, the locking lever 42 tends to rotate clockwise about the pin 42a, but is blocked from further movement by the abutment of its one arm against a pin 40b which is fixedly mounted on the arm of the unlocking lever 40. Under this condition, the other arm of the lever 42 engages the pin 37a at its free end, thus preventing rotation of the gear 37. A switch operating pin 42b is fixedly mounted on the end of the first arm of the locking lever 42, and trigger switches SW2, SW3 are disposed adjacent to the pin 42b. These switches are formed as normally open switches, but are normally maintained closed by the pin 42b as a result of the clockwise rotation of the locking lever 42 about the pin 42a. These switches open when the lever 42 rotates counter-clockwise.

A second blind locking lever 44 is disposed adjacent to the gear 38 and is pivotally mounted on a pin 44a, and is biased by a tension spring 44d to rotate counter-clockwise about the pin 44a. However, the resulting rotation is prevented by the engagement of a depending piece 44b from its one arm with the other arm of the lever 40. During a film winding operation, the locking lever 44 is driven for angular movement by the unlocking lever 40 until the depending piece 44b is driven against an electromagnet Mg2, and during the time the electromagnet Mg2 is energized, a branch 44c engages the pin 38a on the gear 38, thus preventing the second blind 29 from running.

A movable reflecting mirror 52 is disposed in vertically movable manner in front of the first blind 25 which normally covers the photosensitive surface of the film F. A drive mechanism for the reflecting mirror 52 is disposed to the right, as viewed in the drawings, of the mirror. The drive mechanism includes a mirror charging lever 45 which is pivotally mounted on a pin 45a intermediate its end, and is biased to rotate counter-clockwise about the pin 45a by a pair of tension springs 46, 47 engaging with its opposite arms. However, the resulting rotation is limited to a position which it reaches when the shutter is charged during a film winding operation, as the charging lever 45 is driven for angular movement in the clockwise direction about the pin 45a against the bias of the springs 46, 47 until a pin 45c on its one arm engages a hook 48, whereupon it remains at rest. One arm of the mirror charging lever 45 extends in the horizontal direction, and one arm of a mirror drive lever 49 extends below such arm. These arms are connected together by the spring 47. The mirror drive lever 49 is pivotally mounted on the pin 45a, and fixedly carries a pin 49a on the end of its other arm which extends downwardly, which pin engages a hook 50 to maintain the spring 47 in a charged condition.

A connecting lever 51 is vertically disposed behind each one arm of the levers 45, 49, and is pivotally mounted at its lower end on a pin 51a. Intermediate its length, the lever 51 fixedly carries a horizontally extending pin 51b which extends into an arcuate elongate slot 49c formed in one arm of the drive lever 49. An elongate slot 51c is formed in the end region thereof, and is engaged by a drive pin 52b which is fixedly mounted on the side of the movable reflecting mirror 52. As is well recognized, the mirror 52 is disposed on a pin 52a in alignment with the optical axis O and at an angle of 45° relative thereto, and when the connecting lever 51 rotates counter-clockwise about the pin 51a, it rotates clockwise about the pin 52a to rise vertically, while when the lever 51 rotates clockwise, it moves down from the up position toward the initial position.

Disposed in the path of rotation of the pin 49a located on the arm end of the drive lever 49 is one arm 53b of a mirror return lever 53. The central portion of the return lever 53 is pivotally mounted on a pin 53a, and the arm 53b is engaged by a spring 53d, thus tending to rotate counter-clockwise about the pin 53a. However, the resulting rotation is normally blocked by the engagement of its other arm 53c with one arm of a detent member 54. The arm 53c engages the detent member 54 at a position such that the pin 49a gently bears against the arm 53b of the lever 53 as the drive lever 49 is operated to move the mirror 52 up. To lower the mirror 52 from its up position manually, a mirror down button 55 is depressed to rotate the detent member 54 counter-clockwise about the pin 54a, whereby the mirror return lever 53 is rocked clockwise about the pin 53a to angularly drive the mirror drive lever 49 through the pin 49a until the mirror down position is reached.

The rear end of the mirror drive lever 49 is provided with a switch actuator piece 49b formed by an electrically insulating material, which closes a second power switch SW12 when the lever 49 has moved the mirror 52 to its up position. As the lever 49 rotates to move the mirror 52 to its up position, one arm thereof bears against the pin 45b on one arm of the mirror charging lever 45.

Figure 3:
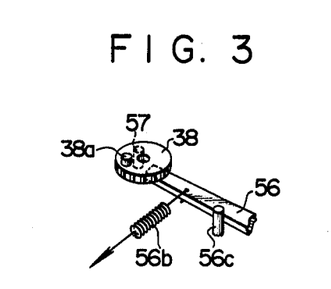
FIG. 3 is a perspective view of part of a return lever.

A mirror return lever 56 is horizontally disposed below the reflecting mirror 52 intermediate the drive mechanism therefor and the shutter blind drive mechanism. The lever 56 has its central portion pivotally mounted on a pin 56a, and includes one arm which extends toward the shutter drive mechanism, with its end located in the path of rotation of a depending pin 57 from the gear 38, as shown in FIG. 3. The lever 56 includes another arm which extends toward the drive mechanism for the reflecting mirror 52, as shown in FIG. 2, and bears against the rear end of the hook 48. A spring 56b (see FIG. 3) is engaged with one arm of the return lever 56 to cause it to rotate counter-clockwise about the pin 56a, but the resulting rotation is blocked by a stop pin 56c. Under this condition, the end of the arm is located on the path of rotation of the pin 57 while the end of the other arm bears against the hook 48. At the termination of the running of the second blind 29, the lever 56 is driven by the pin 57 to rock clockwise about the pin 56a, thereby causing the end of its other arm to angularly drive the hook 48 to unlock the mirror charging lever 45, thus allowing the mirror 52 to move down.

A plurality of light receiving elements P1, P2, P3, P4 which are used for the purpose of photometry are disposed so as to be capable of receiving reflected light from the surface of the first shutter blind and the photosensitive surface of the film. A pair of light emitting elements P5, P6 which serve as the means for indicating an improper exposure are disposed between a pentaprism 60 and a focussing plate 61 so that their flashing can be viewed within the viewfinder. The elements P1 and P2 are referred to collectively as first photometric elements while the elements P3 and P4 as second photometric elements.

A film speed switching dial 62 is disposed so as to be exposed outside the camera body and is formed with a film speed scale 62a on its surface, and includes a rotating shaft on which a sliding electrical contact 63 is integrally mounted. A resistor substrate 64 is disposed below the contact 63, which is disposed for sliding contact with the latter to thereby form a variable resistor VR3.

A switching device 65 for selecting a photographing mode is disposed adjacent to the mirror drive mechanism. The switching device 65 includes a mode switching knob 65a which is exposed outside the camera body, a cam array 66 comprising a plurality of cam discs integrally mounted on the rotating shaft of the knob 65a for operating the switches, and a group of mode selecting switches SW4, SW5 . . . SW11 which are operated by the cam array 66. The knob 65a is formed with indicia on its top surface, including "OFF" indicating a power off condition, "M" indicating a manual photographing operation, "AA" indicating an automatic photographing operation with preset diaphragm aperture, "SA" indicating an automatic photographing operation with a preset exposure period, and "PA" indicating an automatic, programmed photographing operation. When the knob 65a is turned to bring one of these indicia into alignment with an index 65b, a corresponding photographing mode is established in the camera. Thus, the selection by the switching knob 65a transfers the group of changeover switches SW4 to SW11 in accordance with the table shown in FIG. 5, thus controlling the electrical circuit. In this group, the switch SW11 represents a first power switch.

A programmed condition switching device 67 is disposed adjacent to the mode selection switching device 65, and is exposed outside the camera body. It includes a programmed condition changeover knob 67a on the top surface of which are marked "PA1", "PA2" and "PA3" indicating different programmed conditions, an index 67b used for alignment of the indications on the knob, and a changeover switch SW1 which includes a sliding contact 68 integrally mounted on the rotary shaft of the knob 67a and disposed for switching the connection with resistors R2, R3 and R4 provided on a resistor substrate 69. In FIG. 2, reference numeral 70 represents an exposure window.

Figure 4:
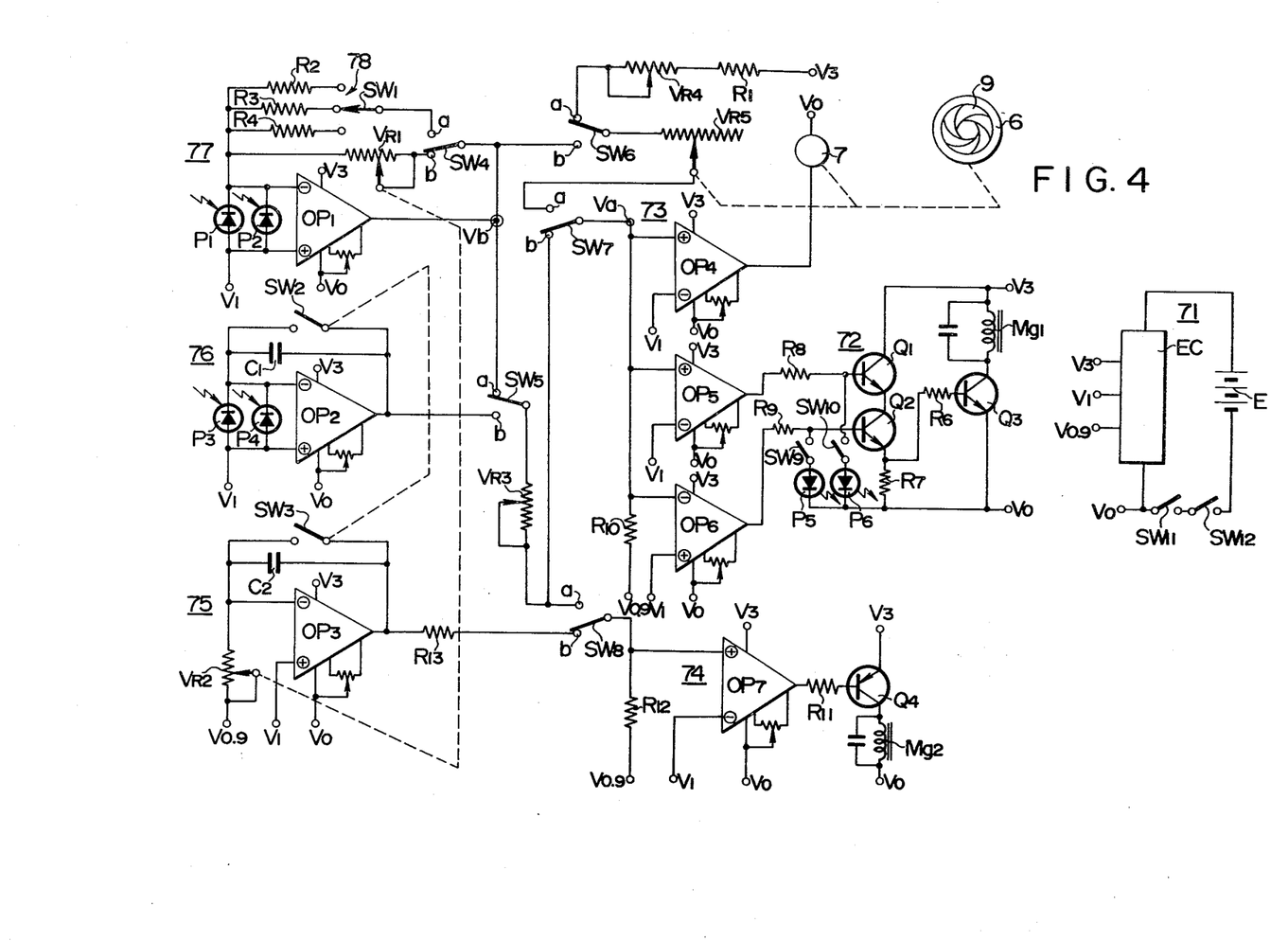
FIG. 4 is a circuit diagram of an electrical circuit which may be used in the camera of FIGS. 1 and 2.

Referring to FIG. 4, one form of the electrical circuit incorporated into the camera of the invention will be described. The electrical circuit shown comprises power source circuit 71, a first blind run control circuit 72, an electromagnetic diaphragm mechanism drive circuit 73, a second blind run control circuit 74, a manual exposure period presetting circuit 75, an automatic exposure period control circuit 76 and an automatic diaphragm aperture control circuit 77.

The power circuit 71 comprises a source E such as a dry cell which is connected with a constant voltage circuit EC in series with a first and second power switch SW11, SW12. The circuit EC provides three constant voltage levels, for example, 3, 1 and 0.9 volts, respectively, at output terminals V3, V1 and V0.9 respectively. In addition, a zero volt level is produced at terminal V0.

The first blind run control circuit 72 includes the first blind constraining electromagnet Mg1 which has its coil connected through a switching transistor Q3 across the output terminal V3 and terminal V0. The transistor Q3 receives an input through resistor R6 from an AND circuit which comprises a pair of transistors Q1 and Q2. Thus, the transistor Q3 is rendered conductive to energize the coil Mg1 only when the AND circuit is enabled, thus demagnetizing the core to remove the attraction of the electromagnet Mg1.

The transistors Q1 and Q2 are connected across the terminals V3 and V0 in series with resistor R7, and the aforementioned light emitting elements P5 and P6 are connected through the switches SW9, SW10 across the base of the respective transistors and the terminal V0. The bases of the transistors Q1 and Q2 are respectively connected through resistor R8 and R9 with the output terminal of a comparator OP5 and OP6. The non-inverting input of the comparator OP5 and the inverting input of the comparator OP6 are connected through resistor R10 with the terminal V0.9, and are also connected with the movable contact of the switch SW7. When the positive input to the comparator OP5 exceeds 1 volt, its output voltage rises above 3 volts to turn on the transistor Q1. When the voltage level on the inverting input of the comparator OP6 is below 1 volt, its output voltage exceeds 3 volts to turn on the transistor Q2. It will be noted that the inverting input of the comparator OP5 and the non-inverting input of the comparator OP6 are both connected with the terminal V1.

The electromagnetic diaphragm mechanism drive circuit 73 comprises a servo amplifier OP4, which has its output terminal connected with the coil 7 of the electromagnetic diaphragm mechanism. The non-inverting input of the amplifier OP4 is connected with the movable contact of the switch SW7 while its inverting input is connected with the terminal V1. The servo amplifier OP4 operates to increase the output voltage to the coil 7 when the voltage level on the non-inverting input is higher than the voltage level on the inverting input, to decrease the output voltage when the voltage level on the non-inverting input is less than the voltage level on the inverting input, and to maintain the output voltage unchanged when the voltage levels on the both input terminals are of the same potential.

The variable resistor VR4 having a resistance which varies as the diaphragm ring 1 (see FIG. 1) is turned has its one end connected through a fixed resistor R1 with the terminal V3 while its other end is connected with the terminal a of the mode selection switch SW6. The variable resistor VR5 having a resistance which varies as the diaphragm blade drive ring 6 is turned has its one end connected with the movable contact of the switch SW6 and its sliding contact connected with the terminal a of the switch SW7, whereby it is selectively connected to the input of the servo amplifier OP4 and the comparators OP5, OP6 through the switch SW7.

The second blind run control circuit 74 includes the electromagnet Mg2 which constrains the second blind and which is connected across the terminals V3 and V0 in series with switching transistor Q4, which has its base connected through resistor R11 with the output terminal of a comparator OP7. The non-inverting input of the comparator OP7 is connected with the movable contact of the mode selection switch SW8, and is also connected through resistor R12 with the terminal V0.9. The inverting input is connected with the terminal V1.

The manual exposure period presetting circuit 75 comprises the variable resistor VR2 having a resistance which varies as the shutter speed presetting ring 17 (see FIG. 2) is turned. The resistor VR2 has its one end connected with the terminal V0.9 and its other end connected with the inverting input of an operational amplifier OP3, the output terminal of which is connected through resistor R13 with the terminal b of the mode selection switch SW8, and is also connected through an integrating capacitor C2 to provide a partial feedback to its inverting input. The non-inverting input is connected with the terminal V1. A trigger switch SW3 which is opened as the first blind begins to run is connected across the capacitor C2.

The automatic shutter period control circuit 76 comprises the light receiving elements P3 and P4 which operate to determine the amount of reflected light from the photosensitive surface of the film and the surface of the first shutter blind. These elements are connected in parallel with each other across the inputs of the amplifier OP2, the output of which is connected through an integrating capacitor C1 to the inverting input thereof to provide a feedback action and is also connected with the terminal b of the mode selection switch SW5. The non-inverting input of the amplifier OP2 is connected with the terminal V1, and a trigger switch SW2, which is opened as the first blind begins to run, is connected across the capacitor C1. The movable contact of the switch SW5 is connected through a film speed presetting variable resistor VR3 with the terminal a of the mode selection switch SW8, which terminal is in turn connected with the terminal b of the switch SW7.

The automatic diaphragm aperture control circuit 77 comprises the light receiving elements P1 and P2, which are connected in parallel with each other across the inputs of an operational amplifier OP1. A negative feedback path 78 comprising the mode selection switch SW4, the programmed condition changeover switch SW1, resistors R2, R3, R4 and the variable resistor VR1 is connected between the output terminal and the inverting input of the operational amplifier OP1. Specifically, the output terminal of the amplifier OP1 is connected with the movable contact of the switch SW4, the stationary contact a of which is connected with the movable contact of the switch SW1. The stationary contact b of the switch SW4 is connected with one end of the variable resistor VR1 having a resistance which varies as the shutter speed presetting ring 17 (see FIG. 12) is turned and which has its other end is connected with the inverting input of the amplifier OP1 together with the other end of the resistors R2, R3, R4. Additionally, the output terminal of the amplifier OP1 is connected with the terminal b of the switch SW6 and the terminal a of the switch SW5. The non-inverting input of the amplifier OP1 is connected with the terminal V1.

It will be noted that the terminals V3 and V0 supply operating voltages to the corresponding terminals of the operational amplifiers OP1, OP2, OP3, servo amplifier OP4 and comparators OP5, OP6, OP7.

When the coils 7 mounted on the surface of the diaphragm blade drive ring 6 (shown in FIG. 1) are energized, the repulsion or attraction acting between the energized coils and the permanent magnet 5 causes the drive ring 6 to rotate against the resilience of the spring 14. The rotating drive has a magnitude which depends on the magnitude of the current flow through the coils, and the drive ring 6 comes to a stop when the drive is balanced with the resilience or spring force of the spring 14, thus automatically establishing an aperture by means of the diaphragm blades 9. When the manual photographing or automatic photographing with a preset diaphragm aperture is chosen, the current flow through the coils 7 is controlled by the variable resistor VR4 having a magnitude which is determined by the diaphragm ring 1, and in the automatic mode with a preset exposure period or the automatic, programmed mode, the current flow is controlled in the manner to be described later.

Figure 5:
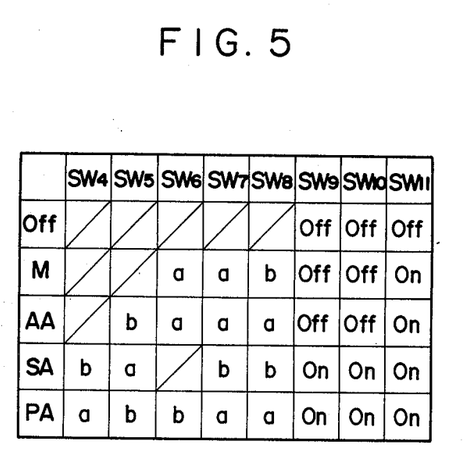
FIG. 5 is a chart representing various conditions assumed by a plurality of switches which are operated as a photographing mode switching knob is operated.

By mounting the lens barrel including the electromagnetic diaphragm mechanism on the camera body, the connectors 13 and 16 (see FIGS. 1 and 2) are interconnected to complete the electrical circuit shown in FIG. 4. The operations which take place when various photographing modes are selected will be described below. The position and the on/off condition of the various mode selection switches SW4 to SW11 are shown in FIG. 5.

1. Manual photographing

Figure 6:
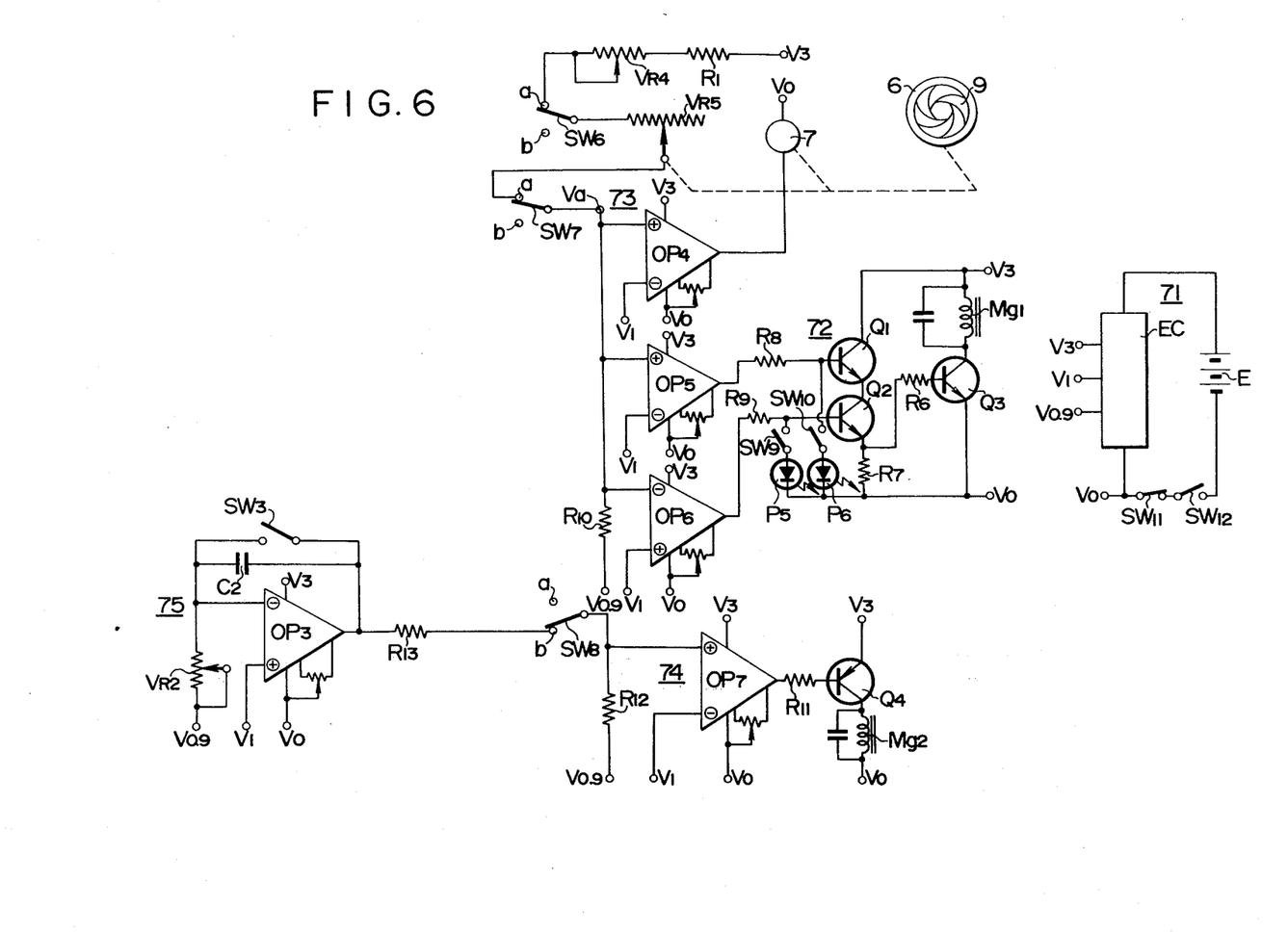
FIGS. 6 to 9 are circuit diagrams of the electrical circuit shown in FIG. 4, illustrating the circuit conditions when the various photographing modes are selected.

When the winding lever 39 (see FIG. 2) moves in the direction of the arrow A in response to a film and shutter winding operation, the unlocking lever 40 associated with the first blind 25 is angularly driven against the resilience of the spring 41, and its armature piece 40c is attracted by the permanent magnet of the electromagnet Mg1, whereby it is maintained in the position to which it is angularly driven. The angular movement of the unlocking lever 40 causes the locking lever 42 associated with the first blind to angularly move to the position shown against the bias applied thereto until it engages the pin 37a on the gear 37 to maintain the first blind 25 in its charged condition, and also turns on the trigger switches SW2 and SW3. The locking lever 44 associated with the second blind is angularly driven by the rotating unlocking lever 40, and its depending piece 44b is moved into abutment against the electromagnet Mg2 and engages the pin 38a on the gear 38, thus maintaining the second blind 29 in its charged condition. On the other hand, the winding operation causes the mirror charging lever 45 to move angularly against the resilience of the spring 46, and the lever 45 is locked by the hook 48 while maintaining the spring 47 charged. When the mode selection knob 65a is turned under this condition until the indication "M" is aligned with the index 65b, the first power switch SW11 is turned on. Subsequently, when an exposure period is chosen by using the shutter speed presetting ring 17, a corresponding resistance of the variable resistor VR2 is established, and the choice of an aperture value by means of the diaphragm ring 1 establishes a resistance of the variable resistor VR4. The resulting connection of the electrical circuit is shown in FIG. 6, where it will be seen that both the automatic exposure period control circuit 76 and the automatic diaphragm aperture control circuit 77 are without effect. When a shutter release button is depressed under this condition, the hook 50 is driven in the direction of an arrow B, unlocking the mirror drive lever 49, whereupon it rotates clockwise under the resilience of the spring 47, causing the mirror 52 to move upwardly through the connecting lever 51. When the mirror 52 has moved upward to assume a horizontal position, the mirrow drive lever 49 bears against the pin 45b on the charging lever 45, interrupting its angular movement, and also closing the second power switch SW12 with the switch actuator piece 49b provided on the rear end thereof. As a result, the power circuit 71 is activated, allowing the various circuits shown in FIG. 6 to become operative. Specifically, since the trigger switch SW3 is closed, the voltage on the non-inverting input is at a lower level than that applied to the inverting input of the comparator OP7 initially, whereby the transistor Q4 is conductive to energize the electromagnet Mg2 to prevent the second blind from running. Since the diaphragm blade drive ring 6 is rotated to a given diaphragm aperture position under the action of the spring 14, the resistor VR5 assumes a low resistance, whereby the voltage Va to the non-inverting input of the servo amplifier OP4 is above 1 volt. Thus, the servo amplifier OP4 provides a high output voltage to increase a current flow to the coils 7, whereby drive ring 6 is rotated against the spring 14 to gradually close the diaphragm blades 9 as a result of the interaction with the permanent magnet 5. As the drive ring 6 rotates, the variable resistor VR5 exhibits an increasing resistance. Thus, the resistance in the non-inverting input circuit of the servo amplifier OP4 which comprises the fixed resistor R1, variable resistors VR4, VR5 increases, reducing the current flow to reduce the voltage Va. When the resistance of the variable resistor VR5 is varied by the drive ring 6 to a point at which the voltage Va becomes equal to 1 volt, the servo amplifier OP4 provides a constant output, and the drive ring 6 comes to a stop where it is balanced with the resilience of the spring 14, thus determining a diaphragm aperture. It should be understood that the balancing position is determined by the value of the variable resistor VR4 which is controlled by the diaphragm ring 1.

As mentioned previously, the comparator OP5 provides an output of 3 volts when the voltage level on the non-inverting input is above 1 volt while the comparator OP6 provides an output of 3 volts when the voltage level on the inverting input as below 1 volt, thus turning the transistors Q1, Q2 on. As a consequence, when the voltage Va is equal to 1 volt, both the transistors Q1 and Q2 conduct to enable the AND circuit, causing a conduction of the transistor Q3. The conduction of the transistor Q3 removes the attraction by the electromagnet Mg1, whereby the unlocking lever 40 is angularly driven under the action of the spring 41, with its pin 40b causing a clockwise rotation of the locking lever 42. The rotation of the locking lever 42 unlocks the gear 37, thereby allowing the running of the first blind 25 to begin. Simultaneously, the disengagement of the pin 42b opens the trigger switches SW2, SW3. Then a current flow of a magnitude depending on the value of the variable resistor VR2 which is determined by the shutter speed presetting ring 17 occurs to initiate the charging of the integrated C2 included in the negative feedback circuit of the operational amplifier OP3, causing the voltage on the non-inverting input of the comparator OP7 to rise until it becomes equal to 1 volt, whereupon the comparator OP7 produces an output of 3 volts to turn off the transistor Q4, whereby the electromagnet Mg2 is deenergized to release the locking lever 44 associated with the second blind. Consequently, the locking lever 44 rotates counter-clockwise under the action of the spring 44d, unlocking the gear 38 and allowing the second blind 29 to run. At the termination of the running of the second blind, the pin 57 on the gear 38 drives the lever 56 to cause it to rotate in the clockwise direction. The resulting rotation of the return lever 56 angularly drives the hook 48 in the direction indicated by an arrow C, thus unlocking the charging lever 45. As a consequence, the charging lever 45 rotates counter-clockwise under the action of the spring 46, and the pin 45b thereupon rotates the mirror drive lever 49 counter-clockwise to move the mirror 52 down.

2. Automatic photographing with preset diaphram aperture

Figure 7:
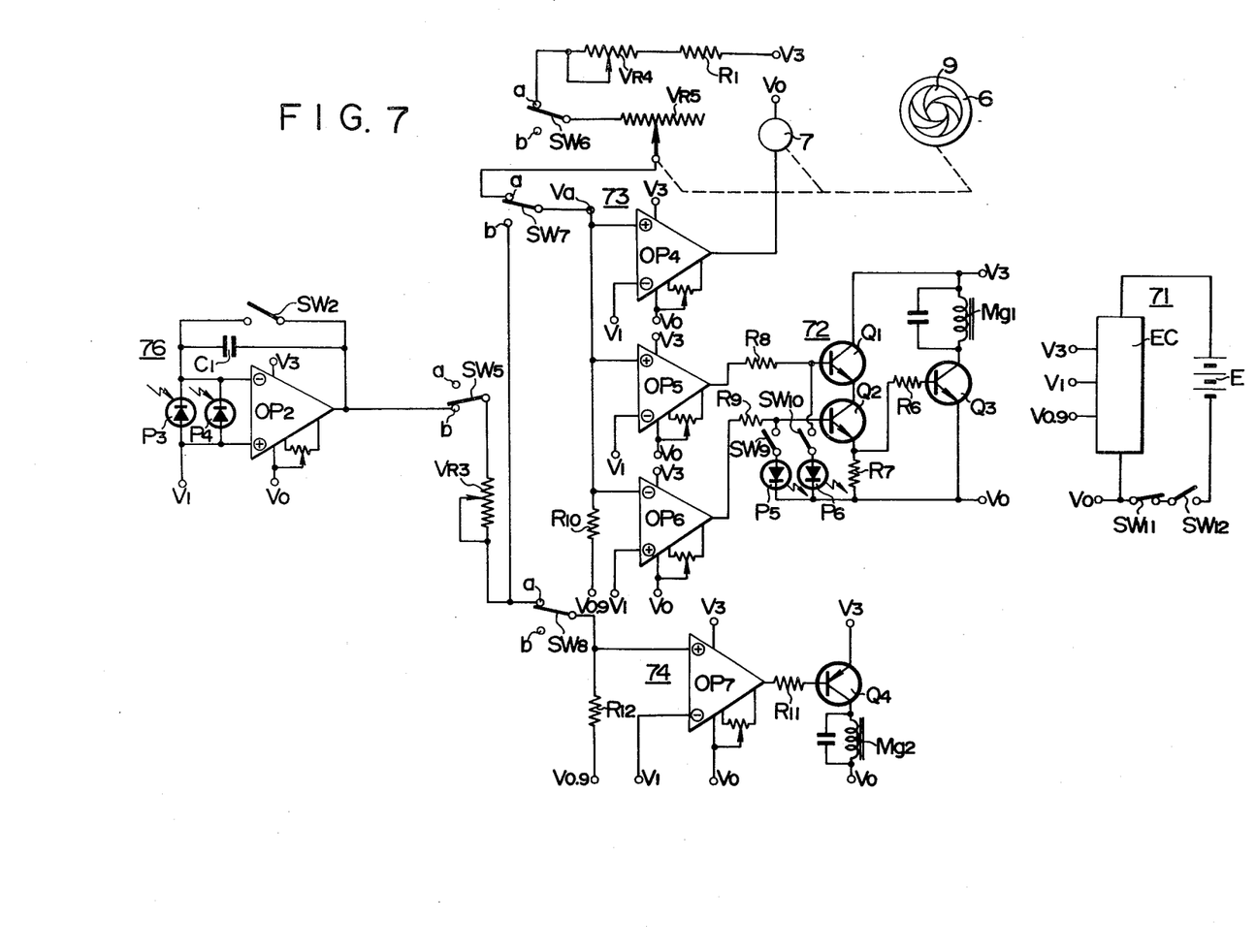

In this instance, the selection knob 65a is turned until the indication "AA" is aligned with the index 65b, whereby the mode selection switches SW5 to SW11 are thrown to the respective positions shown in FIG. 7. No use is made now of the manual exposure period presetting circuit 75 and the automatic diaphragm aperture control circuit 77. The diaphragm is established by means of the diaphragm ring 1 in the same manner as in the manual photographing operation. When the shutter release button is depressed, the first blind 25 begins to run. On the other hand, the elements P3 and P4 receive reflected light from the first blind 25 and the exposed surface of the film F, initiating the charging of the capacitor C1 with a current which depends on the amount of light received, from the time when the trigger switch SW2 is turned off. The comparator OP7 produces an output of 3 volts at the time the voltage across the capacitor C1 is equal to 1 volt, whereupon the transistor Q4 is turned off to deenergize the electromagnet Mg2, thus allowing the second blind 29 to run. The film speed presetting variable resistor VR3 is connected between the non-inverting input of the comparator OP7 and the integrating capacitor C1, thus permitting the timing at which the comparator OP7 produces an output to be varied in accordance with the film speed.

In the manual photographing and the automatic photographing with preset diaphragm aperture mentioned above, it will be seen that in the event of a reduction in the source voltage or in the event of the failure of establishing a given diaphragm aperture as a result of malfunctioning of the diaphragm blade drive ring 6, or in the event of a diaphragm aperture being established which is smaller than the given value, either one of the comparators OP5, OP6 will not produce an output, thus preventing the AND circuit comprising the transistors Q1 and Q2 from being enabled. As a consequence, no demagnetization of the electromagnet Mg1 occurs to permit a running of the first blind 25. In other words, only the mirror 52 will be maintained in its up position, allowing the user to recognize a malfunctioning. To reset such condition, the button 55 is depressed to rotate the return lever 53 clockwise to angularly drive the pin 49a on the mirror drive lever 49, thereby returning the mirror 52 to its original position. Thus it will be seen that a waste of the film is avoided in the camera of the invention since no shutter operation will take place under such abnormal condition.

3. Automatic photographing with preset exposure period

Figure 8:
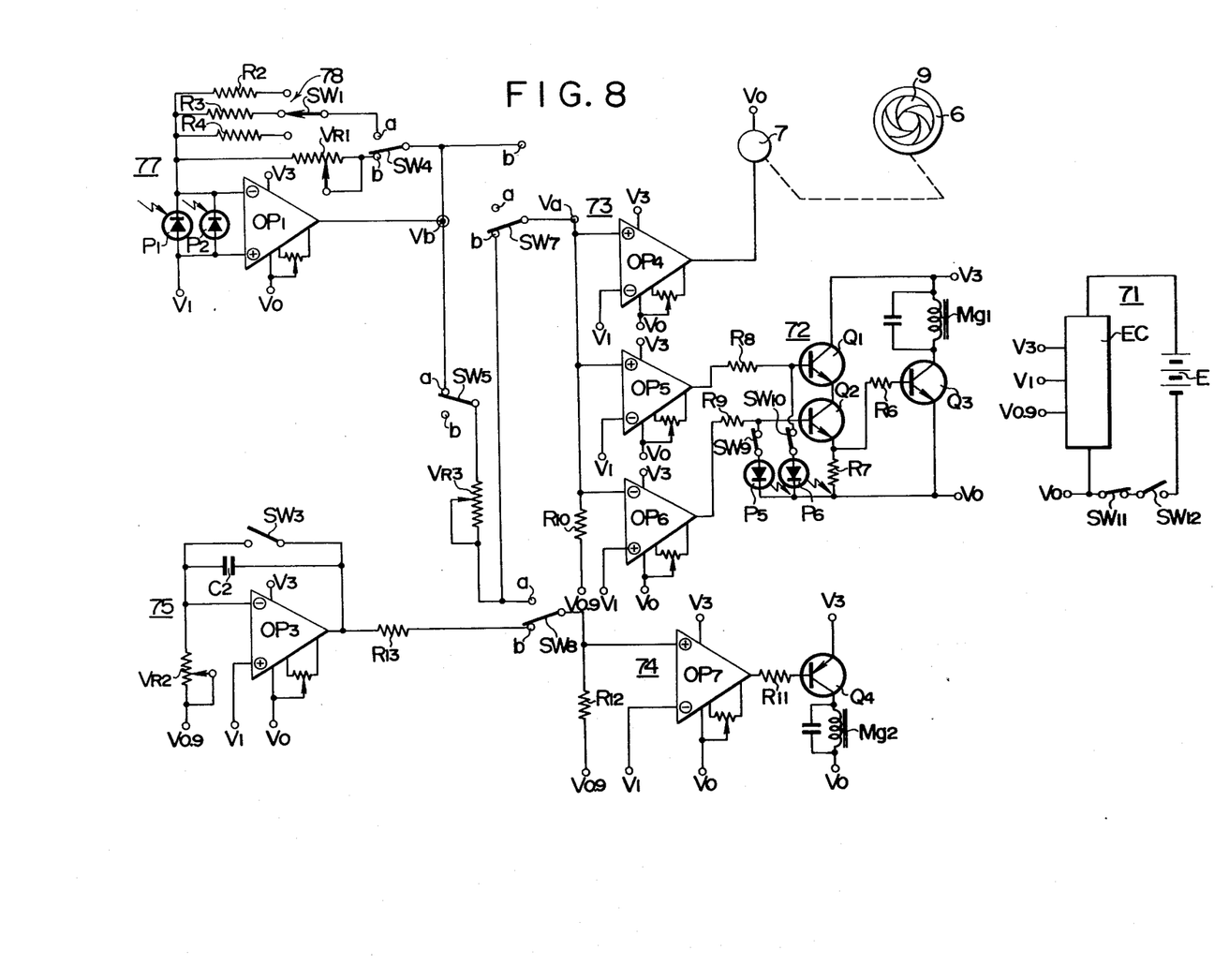

The mode selection knob 65a is turned until the indication "SA" is aligned with the index 65b. The switches SW4 to SW11 will be changed as shown in FIG. 8.

In this instance, no use is made of the automatic exposure period control circuit 76, and the electromagnetic diaphragm mechanism is driven by the automatic diaphragm aperture control circuit 77. As the ring 17 is turned, the resistance of each of the variable resistors VR1, VR2 is established in accordance with a selected exposure period. On the other hand, the depression of the shutter release button causes the mirror 52 to move up, and when the main switch SW12 is turned on, the elements P1 and P2 receive reflected light from the first blind 25 and the exposed surface of the film F. The operational amplifier OP1 provides a current flow through the variable resistor VR1 which is proportional to the photometric value. As a result, the operational amplifier OP1 provides an output voltage Vb which represents the product of the resistance of the variable resistor VR1 established by the ring 17 and the value of the photocurrent. The greater the intensity of the reflected light, the higher the output voltage, and vice versa. The output voltage Vb is supplied through the variable resistor VR3 to the non-inverting input of the servo amplifier OP4, and when the amount of reflected light is high enough to cause the input voltage Va to the non-inverting input to exceed 1 volt, the diaphragm blade drive ring 6 will be moved against the resilience of the spring 14, causing the diaphragm blades 9 to define a smaller diaphragm aperture. As the diaphragm aperture is gradually decreased, the amount of reflected light will decrease in a corresponding manner, thus reducing the voltage Vb. This will cause a diaphragm aperture to be established at which the voltage Va is equal to 1 volt. By determining the resistance of the variable resistor VR1 which is interlocked with the ring 17 so that the light amount which obtains at this time represents a proper exposure, automatic control of the diaphragm aperture is performed when the exposure period is predetermined. When the voltage Va is equal to 1 volt, representing a proper diaphragm aperture, both comparators OP5 and OP6 produce an output of 3 volts, causing the transistors Q1 and Q2 to conduct, which in turn renders the transistor Q3 conductive, thus demagnetizing the electromagnet Mg2 to permit a running of the first blind 25. As the first blind runs, the trigger switch SW3 is turned off, and after an exposure period determined by the resistance of the variable resistor VR2, controlled by the ring 17 in the same manner as in the manual photographing operation, the electromagnet Mg2 is demagnetized to permit a running of the second blind 29. The variable resistor VR3 is effective to control the diaphragm aperture in accordance with the film speed.

In the event an object being photographed is too bright or too dark to establish a diaphragm aperture which represents a proper exposure, or stated differently, when a proper value of diaphragm aperture is greater than the maximum aperture or smaller than the minimum aperture, the drive ring 6 will remain stationary at a position which corresponds to the maximum or minimum aperture. Assuming an instance in which an object being photographed is too bright, for example, the variable resistor VR5 controlled by the drive ring 6 will remain stationary at a position where the maximum resistance is obtained, so that the input voltage Va to the comparators OP5 and OP6 will remain above 1 volt. As a consequence, the comparator OP5 will produce an output of 3 volts while the comparator OP6 will produce an output of zero volt, thus maintaining the transistor Q2 off. As a result, the transistor Q3 remains off and the electromagnet Mg1 cannot be demagnetized to thereby preclude the initiation of running of the first blind 25 while maintaining the mirror 52 in its up position. At the same time, the light emitting element P6 is activated, indicating an overexposure. Conversely, when an object being photographed is too dark, the transistor Q1 remains off, again preventing a running of the first blind 25. In this instance, the light emitting element P5 will be activated, indicating an underexposure.

4. Automatic, programmed photographing

Figure 9:
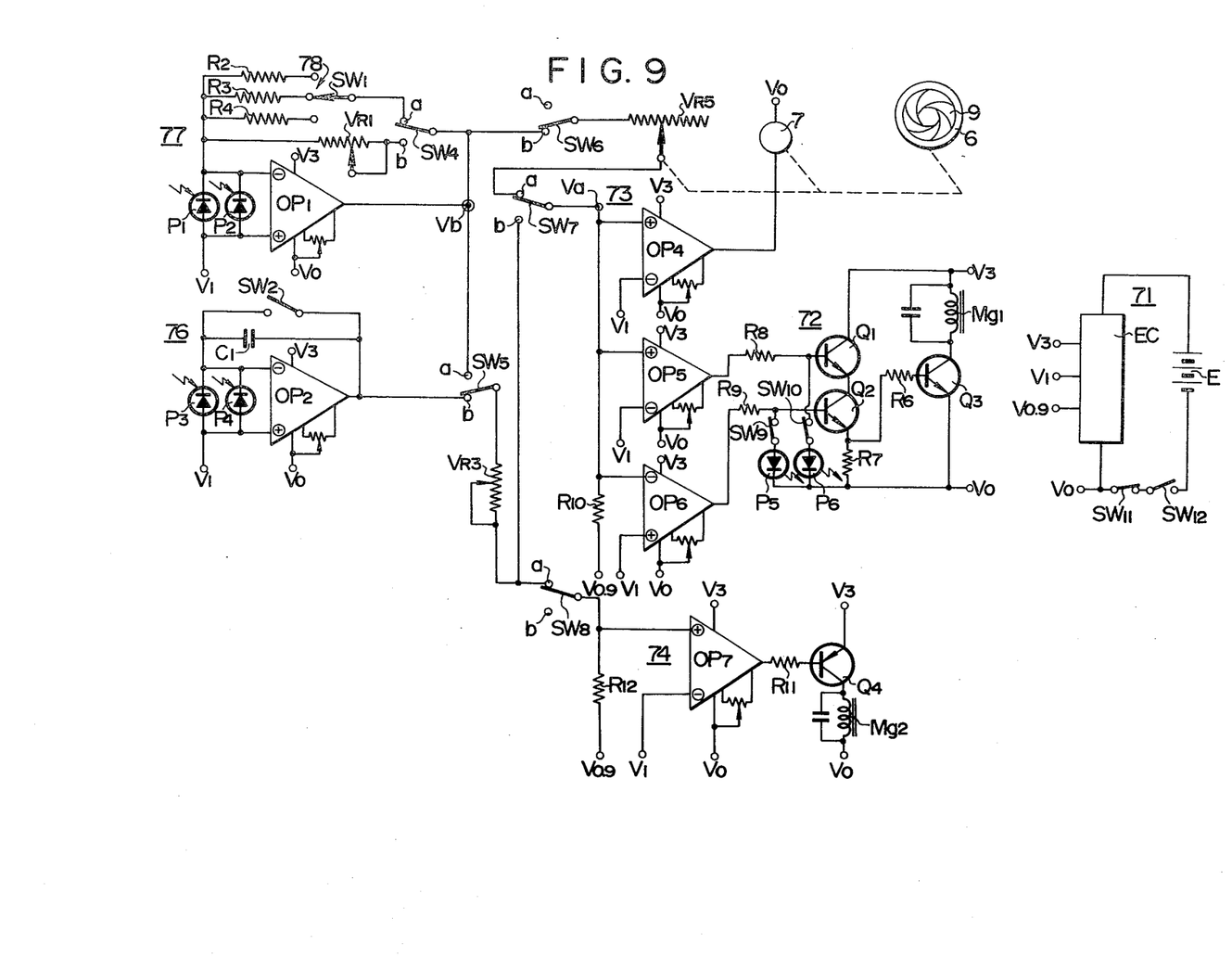

In this instance, the mode selection knob 65a is turned until the indication "PA" is aligned with the index 65b. The switches SW4 to SW11 will be changed as shown in FIG. 9. No use is now made of the manual exposure period presetting circuit 75, and the electromagnetic diaphragm mechanism will be driven by the automatic diaphragm aperture control circuit 77 through the circuit 73. By the operation of the programmed condition changeover knob 67a, one of the resistors R2, R3 or R4 is selected. Upon shutter release under this condition, the mirror 52 moves up to turn on the power switch SW12. The elements P1 and P2 receive reflected light from the blind surface and the film surface, respectively, and the operational amplifier OP1 produces an output voltage Vb which is proportional to the brightness. The output voltage Vb is fed through the variable resistor VR5, which is moved by the drive ring 6, to the non-inverting input of the servo amplifier OP4. When the input voltage Va to the non-inverting input is at a higher potential than 1 volt, an output from the amplifier OP4 will tend to close the diaphragm blades. Consequently, the reflected light which impinges on the elements P1 and P2 will decrease, resulting in a reduction in the voltage Vb. As the diaphragm aperture is reduced, the resistance of the variable resistor VR5 increases, causing a rapid reduction in the magnitude of the voltage Va. In this manner, the magnitude of the voltage Va rapidly shifts to one volt as a result of a variation in the amount of light which was caused by a reduction in the diaphragm aperture and a variation in the resistance of the variable resistor VR5. When the variable resistor VR5 is arranged to exhibit a resistance which increases by a factor of two for a movement of the drive ring 6 corresponding to a change in the diaphragm aperture which is equivalent to one step, it will be seen that one step change of the diaphragm aperture, for example, from F5.6 to F8, results in a reduction in the amount of reflected light by a factor of two as is the voltage Vb while the value of the resistor VR5 will increase by a factor of two, thus causing a reduction in the magnitude of the voltage Va which corresponds to two steps. In other words, a program is obtained such that the diaphragm aperture changes by one step when the brightness of an object being photographed changes by 2EV. By a suitable choice of the resistors R2, R3, R4 by the changeover switch 67a, a programmed diaphragm aperture value corresponding to a given brightness can be modified. Thus, the value of diaphragm aperture for a given brightness level measured by the light receiving elements P1 and P2 can be determined in a programmed manner, and when the voltage Va is equal to 1 volt, the electromagnet Mg1 is demagnetized to permit the initiation of running of the first blind 25. As the first blind runs, the trigger SW2 is turned off and the photometry by the light receiving elements P3 and P4 controls an exposure period at a diaphragm aperture which is determined in the similar manner as in the automatic photographing with preset diaphragm aperture. As before, the comparators OP5, OP6 operate to activate the light emitting element P5 or P6 to provide an indication of improper exposure, namely, overexposure or underexposure, in the same manner as in the automatic photographing with preset exposure period. It will be appreciated that while the above description assumed that the resistance of the variable resistor changes by a factor of two for one step change of the diaphragm aperture, the magnitude of change in the resistance can be modified in a suitable manner to achieve a desired programmed curve plotting the diaphragm aperture against the brightness.

What is claimed is:

1. A focal plane shutter camera of the type including a focal plane shutter comprising a first blind and a second blind and in which photometry is made of light from an object being photographed which passes through a taking lens and a diaphragm and into the camera and which is reflected by at least one of the surfaces including the shutter blind and a film surface; the camera comprising a light receiving element for receiving light from an object being photographed which passes through the taking lens into the camera and which is reflected by at least one of the surfaces including the shutter blind and the film surface; a first shutter blind drive mechanism and a second shutter blind drive mechanism each operative to permit a running of the first blind and the second blind, respectively, for opening and closing the shutter; an electromagnetic diaphragm mechanism assembled into the lens barrel of the taking lens for electromagnetically opening and closing the diaphragm; a manual exposure period control circuit for permitting a manual setting of the exposure period externally of the camera; an automatic diaphragm aperture control circuit including the light receiving element for outputting a diaphragm control signal in accordance with the brightness of an object being photographed, and responsive to an output from the manual exposure period control circuit; a drive circuit responsive to an output from the automatic diaphragm aperture control circuit for driving the electromagnetic diaphragm mechanism; a first shutter blind run control circuit responsive to an output of the automatic diaphragm aperture control circuit for operating the first blind drive mechanism; and a second shutter blind run control circuit responsive to an output of the manual exposure period control circuits for operating the second blind drive mechanism; the camera being capable of automatic photographing with a preset exposure period.

2. A focal plane shutter camera according to claim 1 in which the first blind run control circuit comprises a pair of comparators responsive to an output of the automatic diaphragm aperture control circuit, and a pair of switching transistors connected to receive the output of each comparator and forming an AND circuit, the AND circuit being enabled to permit a shutter operation only when a proper diaphragm aperture is formed.

3. A focal plane shutter camera according to claim 2 in which the inputs of the AND circuit are connected with light emitting elements which provide an indication of an improper exposure visible within the viewfinder of the camera.

4. A focal plane shutter camera of the type including a focal plane shutter comprising a first blind and a second blind and in which photometry is made of light from an object being photographed which passes through a taking lens and a diaphragm into the camera and which is reflected by at least one of the surface of the shutter blind and a film surface; the camera comprising a first and a second light receiving element for receiving light from an object being photographed which passes through the taking lens into the camera and which is reflected by at least one of the surfaces including the shutter blind and the film surface; a first shutter blind drive mechanism and a second shutter blind drive mechanism each operative to permit a running of the first blind and the second blind, respectively, for opening and closing the shutter; an electromagnetic diaphragm mechanism assembled into the lens barrel of the taking lens for electromagnetically opening and closing the diaphragm and a manual diaphragm member associated with the mechanism; a manual exposure period control circuit for permitting a manual setting of the exposure period externally of the camera; an automatic diaphragm aperture control circuit including the first light receiving element for outputting a diaphragm control signal in accordance with the brightness of an object being photographed, and responsive to an output from the manual exposure period control circuit; a drive circuit selectively responsive to an output from the automatic diaphragm aperture control circuit and a setting by a manual diaphragm member for driving the electromagnetic diaphragm mechanism; a first shutter blind run control circuit responsive to an output of the drive circuit for operating the first blind drive mechanism; an automatic exposure period control circuit including the second light receiving element for outputting an exposure period control signal in accordance with the brightness of an object being photographed; a second shutter blind run control circuit selectively responsive to an output of the automatic and manual exposure period control circuits for operating the second blind drive mechanism; and a switching device for changing the interconnection between the circuits to permit a selection among photographing modes including a manual photographing, an automatic photographing with a preset exposure period, an automatic photographing with a preset diaphragm aperture and an automatic, programmed photographing operation.

5. A focal plane shutter camera of the type including a focal plane shutter comprising a first blind and a second blind in which photometry is made of light from an object being photographed which passes through a taking lens and a diaphragm and into the camera and which is reflected by at least one of the surfaces including the shutter blind and a film surface; the camera comprising a light receiving element for receiving light from an object being photographed which passes through the taking lens and into the camera and which is reflected by at least one of the surfaces including the shutter blind and the film surface; a first shutter blind drive mechanism and a second shutter blind drive mechanism each operative to permit a running of the first blind and the second blind, respectively, for opening and closing the shutter; an electromagnetic diaphragm mechanism assembled into the lens barrel of the taking lens for electromagnetically opening and closing the diaphragm; resistors selected by a given programmed condition; an automatic diaphragm aperture control signal responsive to an output of a photometry circuit including the resistors and the light receiving elements; a drive circuit responsive to an output of the automatic diaphragm aperture control circuit for driving the electromagnetic diaphragm mechanism; a first shutter blind run control circuit responsive to an output of the automatic diaphragm aperture control circuit for operating the first blind drive mechanism; a light receiving element for receiving light from an object being photographed which passes through the diaphragm which is opened to a given aperture value by the diaphragm mechanism drive circuit and reflected by the surface of the shutter blind or by the film surface; a second shutter blind run control circuit including the light receiving element which circuit initiates a time count operation in synchronism with the initiation of the first shutter blind run and operates the second shutter blind drive mechanism; the camera being capable of an automatic programmed photographing and having a reflex photometry system.

6. A focal plane shutter camera according to claim 5 further including a negative feedback circuit including a plurality of programmed condition changing resistors connected between the output terminal and the input terminal of the automatic diaphragm aperture control circuit, one of the resistors being chosen to establish a desired condition during the programmed photographing operation.

7. A focal plane shutter camera according to claim 5 in which the first blind run control circuit comprises a pair of comparators responsive to an output of the automatic diaphragm aperture control circuit, and a pair of switching transistors connected to receive the output of each comparator and forming an AND circuit, the AND circuit being enabled to permit a shutter operation only when a proper diaphragm aperture is formed.

8. A focal plane shutter camera according to claim 7 in which the inputs of the AND circuit are connected with light emitting elements which provide an indication of an improper exposure visible within the viewfinder of the camera.

* * * * *